United States Patent
Tanaka et al.

(10) Patent No.: US 7,031,172 B2
(45) Date of Patent: Apr. 18, 2006

(54) PMW INVERTER CONTROL APPARATUS AND CONTROL METHOD

(75) Inventors: Yoshiyuki Tanaka, Fukuoka (JP); Katsutoshi Yamanaka, Fukuoka (JP); Eiji Watanabe, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 0 days.

(21) Appl. No.: 10/517,534

(22) PCT Filed: Jun. 4, 2003

(86) PCT No.: PCT/JP03/07087

§ 371 (c)(1),
(2), (4) Date: Dec. 13, 2004

(87) PCT Pub. No.: WO03/107521

PCT Pub. Date: Dec. 24, 2003

(65) Prior Publication Data

US 2006/0056211 A1  Mar. 16, 2006

(30) Foreign Application Priority Data

Jun. 12, 2002  (JP) .............................. 2002-171256

(51) Int. Cl.
*H02M 7/122*  (2006.01)

(52) U.S. Cl. ................................................. 363/56.03

(58) Field of Classification Search ................... 363/55, 363/56.01, 56.02, 56.03, 95, 97, 98, 131, 363/132

See application file for complete search history.

(56) References Cited

U.S. PATENT DOCUMENTS

| 5,361,196 A | * | 11/1994 | Tanamachi et al. ........... 363/41 |
| 6,490,185 B1 | * | 12/2002 | Yamanaka et al. ............ 363/98 |
| 6,795,323 B1 | * | 9/2004 | Tanaka et al. ................ 363/41 |

FOREIGN PATENT DOCUMENTS

| JP | 4-275057 A | 9/1992 |
| JP | 4-275058 A | 9/1992 |
| JP | 7-298623 A | 11/1995 |
| JP | 10-164854 A | 6/1998 |

* cited by examiner

*Primary Examiner*—Gary L Laxton
(74) *Attorney, Agent, or Firm*—Sughrue Mion, PLLC

(57) ABSTRACT

It is an object of the invention to provide a multilevel PWM inverter control apparatus capable of safely carrying out switching from a normal operation to a protecting operation and performing a reset from the protecting operation to the normal run safely and smoothly without requiring a complicated control algorithm.

In the invention, if a current value I which is measured is set to have a level which is equal to or higher than the level of a first reference value $I_1$ and is lower than the level of a second reference value $I_2$, a zero vector to be started from an OOO state in which an intermediate potential is output for all of phases is output (Step 22). If the current value I is set to have a level which is equal to or higher than the level of the second reference value $I_2$ and is lower than the level of a third reference value $I_3$, a base block operation for bringing all of switching units into an OFF state is carried out after outputting the zero vector (Step 28). If the current value I is equal to or greater than the third reference value $I_3$, an emergency stop is carried out (Step 29). When a reset to a normal operation is carried out after the execution of the base block operation, the reset to the normal operation is performed after the execution of the operation for outputting the zero vector.

8 Claims, 4 Drawing Sheets

PRIOR ART

PMW INVERTER CONTROL APPARATUS AND CONTROL METHOD

TECHNICAL FIELD

The present invention relates to a PWM inverter control apparatus and more particularly to a multilevel PWM inverter control apparatus in which four switching units are connected in series for each layer between a DC bus voltage having a plus level and a DC bus voltage having a minus level.

Background Art

In order to control the rotating speed of an AC motor, a PWM inverter control apparatus has widely been used. In the case in which the output current of the PWM inverter control apparatus is increased for some abnormality, it is necessary to limit the output current or to carry out a protecting operation in order to obtain the safety of the PWM inverter control apparatus and the safety of equipment to be connected as a load. In order to implement such a protecting operation, conventionally, the safety has been ensured by using a base block operation for cutting off a gate signal to control ON/OFF of a switching unit and bringing all of the switching units into an OFF state, thereby carrying out a protection.

An operation for detecting the abnormality of an output current to carry out a protection in such a conventional PWM inverter control apparatus is shown in a flowchart of FIG. 4. First of all, the output current is detected and a current value thereof is set to be I (Step 41), and the current value I is compared with a preset reference value $I_{th}$ (Step 42). At the Step 42, a normal run is carried out (Step 43) if the current value I is smaller than the reference value $I_{th}$, and a base block operation is carried out (Step 44) if the current value I is equal to or greater than the reference value $I_{th}$. When a next control cycle comes, the current value I is compared with the reference value $I_{th}$ in the same manner and the base block operation is continuously carried out until the current value I is smaller than the reference value $I_{th}$.

According to such a conventional PWM inverter control apparatus, in the case in which some abnormality is generated so that an output current is increased, the base block operation is carried out so that the protecting operation is performed. However, there has been proposed a multilevel PWM inverter control apparatus for switching an output voltage among three levels having a positive, an intermediate potential and a negative in order to reduce a harmonic component which is generated in addition to a PWM inverter control apparatus for switching an output voltage between two levels having the positive and the negative.

In the multilevel PWM inverter control apparatus, only a voltage which is a half of the voltage of a DC power supply is applied to both ends of each switching unit. For this reason, the breakdown voltage of each switching unit is a half of the voltage of the DC power supply. When the voltage of the DC power supply is exactly applied to both ends, an over voltage breakdown is caused. In such a multilevel PWM inverter control apparatus, a large number of switching units are to be switched so that a structure is complicated. Therefore, a problem arises in the case in which the protecting operation is carried out through a base block. This problem is that the operation timing of each switching unit is shifted when the normal operation is changed to the base block operation and when the base block operation is changed to the normal operation, and a voltage which is at least a double of a normal voltage is applied to one switching unit, resulting in the generation of the overvoltage breakdown.

For example, in the case in which three of the four switching units connected in series are turned ON at the same time, the voltage of the DC power supply is exactly applied to the residual switching unit so that a breakdown is caused.

In order to prevent such a bad influence, as described in JP-A-10-164854 publication, there has been proposed a method of detecting an abnormal state when a switching unit is broken down due to a power short circuit or an overcurrent and delaying a timing for cutting off a specific switching unit in order to prevent the further breakdown of the switching unit due to an overvoltage.

According to such a method of delaying a timing for cutting off a specific switching unit, it is possible to prevent the breakdown of the switching unit to protect an apparatus. In the case in which a multilevel PWM inverter control apparatus is to be protected safely and a smooth reset to a normal run is to be implemented, however, it is necessary to carry out a control in a very complicated timing.

In the case in which an abnormality such as an overcurrent which is detected is temporarily caused, moreover, a smooth reset from the protecting operation to the normal operation is required. However, it is hard to smoothly carry out the reset to the normal operation in the protecting method using a base block in which all of the switching units are turned OFF, and furthermore, a protecting method of delaying a timing for cutting off a specific switching unit.

The conventional multilevel PWM inverter control apparatus has the following problems.

(1) In the case in which only the protecting operation using the base block is carried out, there is a possibility that an overvoltage might be applied to the switching unit, resulting in a breakdown.

(2) In the case in which the breakdown of the switching unit is to be prevented in order to delay a timing for cutting off a specific switching unit, a control algorithm becomes complicated.

(3) In the case in which the protecting operation for bringing all of the switching units into an OFF state is carried out, it is hard to smoothly perform the reset from the protecting operation to the normal operation.

It is an object of the invention to provide a multilevel PWM inverter control apparatus which can implement, in a simple algorithm, a protecting operation capable of safely carrying out switching from a normal operation to a protecting operation and ensuring the safety of an inverter body also when performing a reset from the protecting operation to the normal run, and furthermore, safely supplying a power to equipment to be connected as a load.

DISCLOSURE OF THE INVENTION

In order to attain the object, the invention provides a PWM inverter control apparatus in which four switching units are connected in series for each phase between a DC bus voltage having a plus level and a DC bus voltage having a minus level, comprising:

a current detecting circuit for detecting a current value of an output current; and a controller for outputting a zero vector to be started from an O state in which all phases are turned ON by second and third switching units from the DC bus voltage side having the plus level to output an intermediate potential to be a voltage between the plus and minus levels of the DC bus voltage when the current value measured by the current detecting circuit is equal to or greater than a first reference value which is preset and has a lower level than a level of a second reference value which is higher than a level of the first reference value, carrying out a base block operation for bringing all of the switching units into an OFF state after outputting the zero vector when the current value is equal to or greater than the second reference value and has a lower level than a level of a third reference value which is higher than the level of the second reference value, and executing an emergency stop when the current value is equal to or greater than the third reference value.

According to the invention, when a current value I detected by the current detecting circuit is equal to or greater than a first current value, the base block operation or the emergency stop operation is always carried out after the zero vector state to be started from an OOO state is brought. If the state of the switching unit which is obtained immediately before the execution of a protecting operation is any of P, N and O, therefore, a change in a voltage is reduced to a half of the voltage of a DC power supply so that the switching unit can be prevented from being broken down due to an overvoltage.

Moreover, the states of P, N and O are used also in a normal operation. Therefore, it is possible to smoothly carry out a reset from a zero vector state of PPP, OOO or NNN to a normal operation and to perform the protecting operation without requiring a complicated algorithm.

Furthermore, the controller may carry out a reset to a normal operation after performing a zero vector output operation when executing the reset to the normal operation after carrying out the base block operation.

According to the invention, when a reset from the protecting operation to the normal operation is to be carried out, a zero vector output operation is always performed. Therefore, it is possible to prevent the switching unit from being broken down due to an overvoltage when carrying out the reset from the protecting operation to the normal operation.

Moreover, the invention provides a PWM inverter control apparatus in which four switching units are connected in series for each phase between a DC bus voltage having a plus level and a DC bus voltage having a minus level, comprising:

a current detecting circuit for detecting a current value of an output current; and a controller for outputting such a zero vector as to bring an O state in which all of phases are turned ON by second and third switching units from the DC bus voltage side having the plus level to output an intermediate potential to be a voltage between the plus and minus levels of the DC bus voltage and then carrying out a base block operation for bringing all of the switching units into an OFF state when the current value measured by the current detecting circuit is equal to or greater than a preset reference value, and for outputting such a zero vector as to bring all of the phases into the O state and then performing a reset to a normal run when the current value is smaller than the reference value.

According to the invention, when the normal operation is switched to the protecting operation based on the base block operation, setting is carried out to always bring a zero vector state started from an OOO state when performing a reset from the protecting operation to the normal operation. In the switching from the normal operation to the protecting operation and the reset from the protecting operation to the normal operation, therefore, it is possible to prevent the switching unit from being broken down due to an overvoltage.

In addition, the zero vector may be started from an OOO state in which all of the phases are turned ON by the second and third switching units from the DC bus voltage side having the plus level to output the intermediate potential to be the voltage between the plus and minus levels of the DC bus voltage, and may be always brought into the OOO state between a PPP state in which all of the phases are turned ON by first and second switching units from the DC bus voltage side having the plus level to output the plus level of the DC bus voltage and an NNN state in which all of the phases are turned ON by third and fourth switching units from the DC bus voltage side having the plus level to output the minus level of the DC bus voltage.

Figure 1:
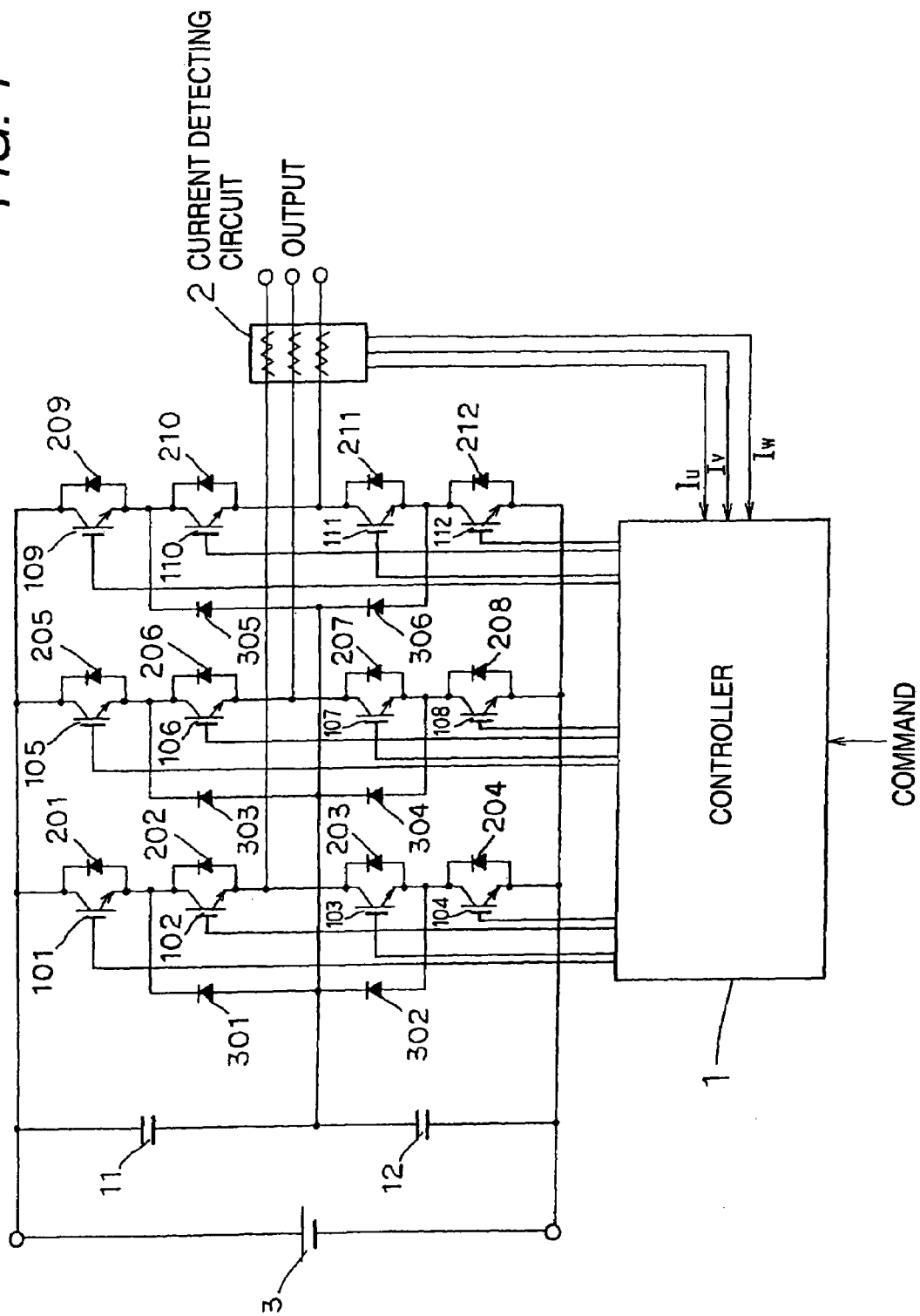
FIG. 1 is a block diagram showing the structure of a PWM inverter control apparatus according to a first embodiment of the invention.

In the drawings, 1 denotes a controller, 2 denotes a current detecting circuit, 3 denotes a DC power supply, 41 to 44 denote a step, 11 and 12 denote a voltage dividing capacitor, 101 to 112 denote a switching unit, 201 to 212 denote a free wheel diode, and 301 to 306 denote a clamp diode.

BEST MODE FOR CARRYING OUT THE INVENTION

Next, embodiments of the invention will be described in detail with reference to the drawings.

First Embodiment

FIG. 1 is a block diagram showing the structure of a PWM inverter control apparatus according to a first embodiment of the invention.

The PWM inverter control apparatus according to the embodiment is constituted by a controller 1, a current detecting circuit 2, a DC power supply 3, smoothing capacitors 11 and 12, switching units 101 to 112, free wheel diodes 201 to 212, and intermediate level outputting clamp diodes 301 to 306.

The controller 1 controls a gate signal input to the gate of each of the switching units 101 to 112, thereby controlling the timing of ON/OFF of each of the switching units 101 to 112. The current detecting circuit 2 measures the current value of a current output from the PWM inverter control apparatus.

In the PWM inverter control apparatus, four switching units are connected in series for each phase. In a circuit constituted by the four switching units 101 to 104, for example, a positive voltage is output when the switching units 101 and 102 are turned ON, an intermediate potential is output when the switching units 102 and 103 are turned ON, and a negative voltage is output when the switching units 103 and 104 are turned ON.

In the following description, assuming that four of the switching units 101 to 112 which are connected in series make a set to be a phase and are indicated as S1, S2, S3 and S4 from an upper side, a state in which two upper switching units S1 and S2 are turned ON is represented as a P state in which the plus level of a DC bus voltage is output, a state in which two middle switching units S2 and S3 are turned ON is represented as an O state in which a neutral voltage subjected to capacitor dividing is output, and a state in which two lower switching units S3 and S4 are turned ON is represented as an N state in which the minus level of a DC bus is output.

The controller 1 according to the embodiment brings the state of each phase into a state of P, N or O during A normal operation, thereby controlling an output voltage to a motor. In the embodiment, when carrying out a protecting operation, the controller 1 controls each switching unit to bring a zero vector state, thereby protecting each switching unit and equipment to be connected. The zero vector state implies a state in which the output voltage of each phase is set to have the same level. In the case in which a three-phase multilevel PWM inverter control apparatus is taken as an example and each phase is described in order, the zero vector state includes three types of states of PPP, OOO and NNN.

Since the PWM inverter control apparatus according to the embodiment shown in FIG. 1 has features in only the control algorithm of the controller 1 and other circuit structures are the same as those in a conventional multilevel PWM inverter control apparatus, detailed description thereof will be omitted.

Figure 2:
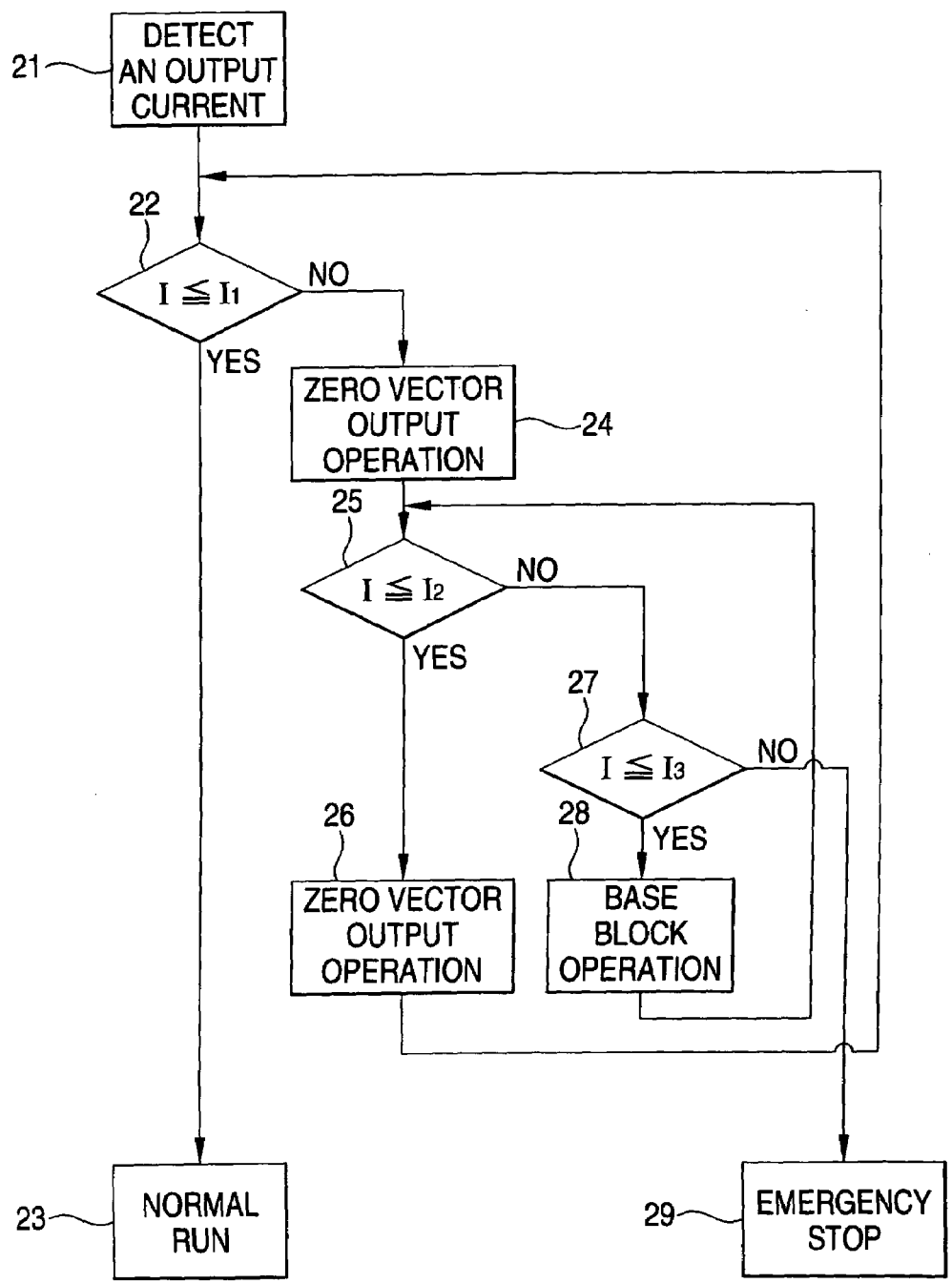
FIG. 2 is a flowchart showing a PWM inverter control method according to the first embodiment of the invention.

Next, the operation of the multilevel PWM inverter control apparatus according to the embodiment will be described in detail with reference to a flowchart of FIG. 2.

First of all, an output current is detected by the current detecting circuit 2 and a current value thereof is set to be I (Step 21), and the controller 1 compares the current value I with a first reference value $I_1$ which is preset (Step 22). If the current value I is smaller than the first reference value $I_1$ at the Step 22, the controller 1 carries out a normal run (Step 23). If the current value I is equal to or greater than the first reference value $I_1$ at the Step 22, the controller 1 stops the normal operation and switching to an operation for outputting a zero vector is carried out for a safety.

Description will be given to the operation for outputting a zero vector. The controller 1 switches the vectors of PPP, OOO and NNN in order and outputs them, and sets to always output the zero vector from the OOO when carrying out the switching to the operation for outputting the zero vector. The reason is as follows. A pulse pattern obtained immediately before outputting the zero vector cannot be predicted. In the case in which the PPP and the NNN are output at the beginning when the switching to the operation for outputting the zero vector is carried out, therefore, a voltage to be applied to the switching unit is suddenly changed and the ON/OFF timing of the switching unit is varied. Consequently, a full voltage is applied to one switching unit in the worst state, resulting in the breakdown of equipment.

For example, in the case in which four switching units for a certain phase are set to the P state, a voltage is changed from a plus level to a minus level so that a fluctuation in a voltage corresponding to the voltage of the DC power supply 3 is generated when the state of the switching units for the same phase is brought into the N state as a protecting operation. To the contrary, in the case in which the states of four switching units for a certain phase are set to the N state, a voltage is changed from the minus level to the plus level so that a fluctuation in the voltage corresponding to the voltage of the DC power supply 3 is generated when the states of the switching units for the same phase are brought into the P state as a protecting operation. On the other hand, in the case in which the state of a switching unit for a certain phase is set to the O state, a change in a voltage is a half of the voltage of the DC power supply 3 at a maximum when a state obtained immediately therebefore is any of P, N and O. Even if the ON/OFF timing of the switching unit is varied, thus, only the half of the voltage of the DC power supply 3 is applied to one switching unit.

In the case in which the zero vector of the NNN is output immediately after the output of the zero vector of the PPP and the reverse case thereto, moreover, there is a danger that a full voltage might be applied to one switching unit due to the variation in the ON/OFF timing of the switching unit as described above. Therefore, the vector of the OOO is set to be output before or after the output of the zero vector of the PPP or NNN, which is safer.

Next, the controller 1 outputs the zero vector at Step 24 and then compares the output current value I which is detected with a second reference value $I_2$ (Step 25). If the current value I is smaller than the second reference value $I_2$ at the Step 25, an operation for outputting the zero vector is continuously carried out (Step 26) and a return to the processing of carrying out a comparison with the first comparison value $I_1$ is performed (Step 22). If the current value I is smaller than the first reference value $I_1$ at the Step 22, a reset to the normal run is carried out (Step 23). If the current value I is equal to or greater than the first reference value $I_1$, the operation for outputting the zero vector is continuously carried out. If the current value I is equal to or greater than the first reference value $I_1$ and is smaller than the second reference value $I_2$, accordingly, the zero vector is continuously output.

In the comparison between the current value I and the second reference value $I_2$ at the Step 25, if the output current value I which is detected is equal to or greater than the second reference value $I_2$, the controller 1 compares the current value I with a third reference value $I_3$ (Step 27). If the current value I is smaller than the third reference value $I_3$ at the Step 27, the controller 1 carries out a base block operation for stopping the operations of all of the switching units 101 to 112 (Step 28). After the processing of the Step 28, then, a return to the processing of comparing the current value I with the second comparison value $I_2$ is carried out (Step 25) and the same processing as that described above is executed. If the current value I is equal to or greater than the second reference value $I_2$, the base block operation is continuously carried out. If the current I is equal to or greater than the second reference value $I_2$ and is smaller than the third reference value $I_3$, accordingly, the controller 1 continuously carries out the base block operation.

In the comparison of the current value I with the third reference value $I_3$ at the Step 27, if the current value I which is detected is equal to or greater than the third reference value $I_3$, the controller 1 stops the operation of the inverter as a final protection and gives an alarm to confirm a whole safety and to carry out restarting (Step 29).

In the processing described above, in the case in which the protecting operation using a base block is carried out and a return from the state in which all of the switching units 101 to 112 are turned OFF to the normal operation is performed, there is a possibility that a shock might be generated depending on the situation of a motor to be connected to equipment if the reset to the normal operation is directly performed. For this reason, the controller 1 is set to carry out the base block operation at the Step 28, and thereafter, to always return the normal operation through the operation for outputting the zero vector at the Step 26 without directly performing the reset to the normal operation.

The first reference value $I_1$ is set to have a slightly higher level than the level of a rated current value. In other words, while the first reference value $I_1$ exceeds the rated current value due to a sudden acceleration/deceleration or a fluctuation in a load, it is permitted in a short time. Accordingly, the controller 1 waits for the current value I to be decreased while outputting the zero vector, and returns to the normal operation if the current value I is smaller than the first reference value $I_1$. The vector itself in the P, N and O states is also output during a normal run. Therefore, this operation can be grasped as a part of the normal run. Therefore, it is possible to smoothly carry out the reset from the protecting operation to the normal run.

While the second reference value $I_2$ has a higher level than the level of the first reference value $I_1$, moreover, it is permitted in a very short time. A state in which the current value I is equal to or greater than the second reference value $I_2$ is generated when an operation exceeding the capability of equipment is to be carried out or due to a sudden change in a load. However, it is necessary to instantly return to the rated current value. For this reason, the controller 1 does not bring the zero vector state in which the output current cannot be reduced rapidly but carries out the protecting operation using the base block.

Furthermore, the third reference value $I_3$ has a higher level than the level of the second reference value $I_2$. In a state in which the current value I is equal to or greater than the third reference value $I_3$, some abnormality is generated and it is necessary to carry out a release after confirming a safety. Therefore, the equipment itself is not automatically reset. This state will be hereinafter referred to as an emergency stop.

Thus, the first to third reference values $I_1$ to $I_3$ are set and the method of the protecting operation is switched depending on the measured current value I in such a manner that a reset to the normal run can be carried out immediately in case of a slight abnormality and the operation can be stopped instantly to ensure the safety in case of a serious abnormality. More specifically, in the case in which a load to be connected to the equipment is operated, it is necessary to meet a demand for safely carrying out a stop operation when some accident is caused without interrupting the run as much as possible.

According to the multilevel PWM inverter control apparatus in accordance with the embodiment, when the current value I detected by the current detecting circuit 2 is equal to or greater than the first current value $I_1$, the base block operation or the emergency stop operation is always executed after the zero vector state is brought. Setting is carried out to first bring the OOO state in the switching from the normal operation to the zero vector state. Even if the state of the switching unit which is obtained immediately before the execution of the protecting operation is any of P, N and O, therefore, a change in a voltage is reduced to be a half of the voltage of the DC power supply 3 so that the switching unit can be prevented from being broken down due to an overvoltage.

Moreover, the states of P, N and O are used also in the normal operation. Consequently, it is possible to smoothly carry out the reset from the zero vector states of PPP, OOO and NNN to the normal operation and to execute the protecting operation without requiring a complicated algorithm.

Furthermore, the zero vector output operation is always carried out in the execution of the reset from the protecting operation to the normal operation. Therefore, it is possible to prevent the switching unit from being broken down due to an overvoltage in the execution of the reset from the protecting operation to the normal operation.

Second Embodiment

Next, description will be given to a PWM inverter control apparatus according to a second embodiment of the invention.

Figure 3:
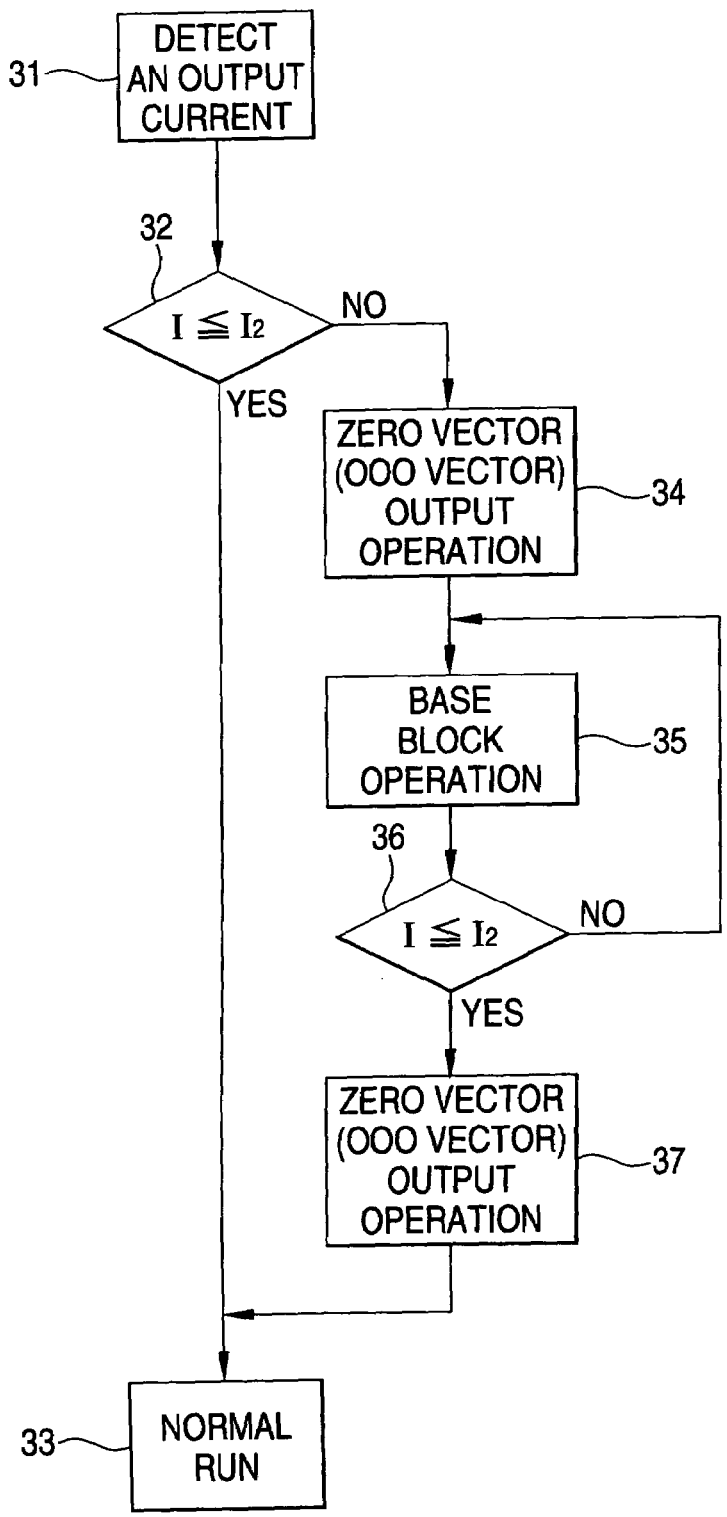
FIG. 3 is a flowchart showing a PWM inverter control method according to a second embodiment of the invention.
Figure 4:
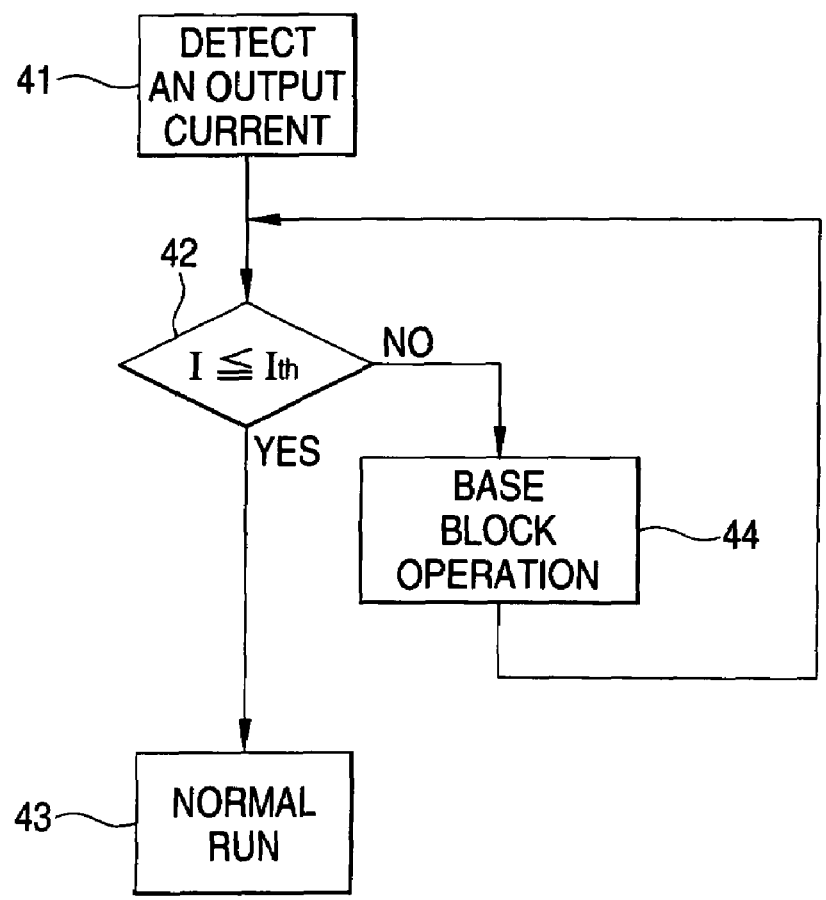
FIG. 4 is a flowchart showing a conventional PWM inverter control method.

The PWM inverter control apparatus according to the embodiment is different from the PWM inverter control apparatus according to the first embodiment shown in FIG. 1 in respect of only the control algorithm of a controller 1. In the following, therefore, the operation of the PWM inverter control apparatus according to the embodiment will be described with reference to a flowchart of FIG. 3.

First of all, an output current is detected by a current detecting circuit 2 and a current value thereof is set to be I (Step 31), and the controller 1 compares the current value I with the second reference value $I_2$ (Step 32). If the current value I is smaller than the second reference value $I_2$ at the Step 32, the controller 1 carries out a normal run (Step 33). If the current value I is equal to or greater than the second reference value $I_2$ at the Step 32, the controller 1 stops the normal operation and outputs a zero vector for a safety (Step 34). Herein, the controller 1 may output only an OOO vector in a zero vector. Next, the controller 1 carries out a protecting operation using a base block (Step 35). Then, the comparison of the current value X and the second reference value $I_2$ is carried out again (Step 36). If the current value I is equal to or greater than the reference value $I_2$, the base block operation is continuously carried out. If the current value I is smaller than the second reference value $I_2$ at the Step 36, the controller 1 outputs the zero vector (Step 37) and is thereafter returned to the normal run (the Step 33). In the same manner as in the Step 34, only the OOO vector in the zero vector may be output. By the execution of such a processing, the controller 1 is set to always carry out the operation for outputting the zero vector before a reset from the protecting operation to the normal operation.

The embodiment supposes an application to a multilevel PWM inverter control apparatus in the case in which a motor connected to equipment having a small number of functions and a simple structure is to be controlled. For this reason, the base block operation is carried out instantly when an overcurrent is simply detected, and the zero vector started from OOO immediately before and after the base block operation is output when a reset from the base block operation to the normal run is to be performed.

Also in the embodiment, in the same manner as in the first embodiment described above, a third reference value $I_3$ may be provided as a final protection and the inverter may be operated to emergently stop as the final protection or a time required for operating the base block may be integrated and an emergency stop may be carried out after the operation is continuously performed for a certain period or more.

While the invention has been described in detail with reference to the specific embodiments, it is apparent to the skilled in the art that various changes and modifications can be made without departing from the spirit and scope of the invention.

The application is based on Japanese Patent Application (JP-A-2002-171256) filed on Jun. 12, 2002 and contents thereof are incorporated by reference.

INDUSTRIAL APPLICABILITY

As described above, according to the invention, in the multilevel PWM inverter control apparatus, it is possible to produce an advantage that switching from a normal operation to a protecting operation can be safely carried out without requiring a complicated control algorithm, and furthermore, the safety of an inverter body can be ensured and a smooth reset from the protecting operation to the normal operation can be performed when the reset is to be executed, and a power can also be supplied safely to equipment to be connected as a load.

The invention claimed is:

1. A PWM inverter control apparatus in which four switching units are connected in series for each phase between a DC bus voltage having a plus level and a DC bus voltage having a minus level, comprising:
   a current detecting circuit for detecting a current value of an output current; and
   a controller for outputting a zero vector to be started from an O state in which all phases are turned ON by second and third switching units from the DC bus voltage side having the plus level to output an intermediate potential to be a voltage between the plus and minus levels of the DC bus voltage when the current value measured by the current detecting circuit is equal to or greater than a first reference value which is preset and has a lower level than a level of a second reference value which is higher than a level of the first reference value, carrying out a base block operation for bringing all of the switching units into an OFF state after outputting the zero vector when the current value is equal to or greater than the second reference value and has a lower level than a level of a third reference value which is higher than the level of the second reference value, and executing an emergency stop when the current value is equal to or greater than the third reference value.

2. The PWM inverter control apparatus according to claim 1, wherein the controller carries out a reset to a normal operation after performing a zero vector output operation when executing the reset to the normal operation after carrying out the base block operation.

3. A PWM inverter control apparatus in which four switching units are connected in series for each phase between a DC bus voltage having a plus level and a DC bus voltage having a minus level, comprising:
   a current detecting circuit for detecting a current value of an output current; and
   a controller for outputting such a zero vector as to bring an O state in which all of phases are turned ON by second and third switching units from the DC bus voltage side having the plus level to output an intermediate potential to be a voltage between the plus and minus levels of the DC bus voltage and then carrying out a base block operation for bringing all of the switching units into an OFF state when the current value measured by the current detecting circuit is equal to or greater than a preset reference value, and for outputting such a zero vector as to bring all of the phases into the O state and then performing a reset to a normal run when the current value is smaller than the reference value.

4. The PWM inverter control apparatus according to any of claims 1 to 3, wherein the zero vector is started from an OOO state in which all of the phases are turned ON by the second and third switching units from the DC bus voltage side having the plus level to output the intermediate potential to be the voltage between the plus and minus levels of the DC bus voltage, and the zero vector is always brought into the OOO state between a PPP state in which all of the phases are turned ON by first and second switching units from the DC bus voltage side having the plus level to output the plus level of the DC bus voltage and an NNN state in which all of the phases are turned ON by third and fourth switching units from the DC bus voltage side having the plus level to output the minus level of the DC bus voltage.

5. A PWM inverter control method for controlling a PWM inverter control apparatus in which four switching units are connected in series for each phase between a DC bus voltage having a plus level and a DC bus voltage having a minus level, comprising the steps of:
   detecting a current value of an output current;
   outputting a zero vector to be started from an O state in which all phases are turned ON by second and third switching units from the DC bus voltage side having the plus level to output an intermediate potential to be a voltage between the plus and minus levels of the DC bus voltage when the current value is equal to or greater than a first reference value which is preset and has a lower level than a level of a second reference value which is higher than a level of the first reference value;
   carrying out a base block operation for bringing all of the switching units into an OFF state after outputting the zero vector when the current value is equal to or greater than the second reference value and has a lower level than a level of a third reference value which is higher than the level of the second reference value; and
   executing an emergency stop when the current value is equal to or greater than the third reference value.

6. The PWM inverter control method according to claim 5, further comprising a step of carrying out a reset to a normal operation after performing a zero vector output operation when executing the reset to the normal operation after carrying out the base block operation.

7. A PWM inverter control method for controlling a PWM inverter control apparatus in which four switching units are connected in series for each phase between a DC bus voltage having a plus level and a DC bus voltage having a minus level, comprising the steps of:
   detecting a current value of an output current;
   outputting such a zero vector as to bring an O state in which all of phases are turned ON by second and third switching units from the DC bus voltage side having the plus level to output an intermediate potential to be a voltage between the plus and minus levels of the DC bus voltage when the current value is equal to or greater than a preset reference value;
   carrying out a base block operation for bringing all of the switching units into an OFF state after outputting the zero vector; and
   outputting such a zero vector as to bring all of the phases into the O state and then performing a reset to a normal run when the current value is smaller than the reference value.

8. The PWM inverter control method according to any of claims 5 to 7, wherein the zero vector is started from an OOO state in which all of the phases are turned ON by the second and third switching units from the DC bus voltage side having the plus level to output the intermediate potential to be the voltage between the plus and minus levels of the DC bus voltage, and the zero vector is always brought into the OOO state between a PPP state in which all of the phases are turned ON by first and second switching units from the DC bus voltage side having the plus level to output the plus level of the DC bus voltage and an NNN state in which all of the phases are turned ON by third and fourth switching units from the DC bus voltage side having the plus level to output the minus level of the DC bus voltage.

* * * * *